Aug. 19, 1969 E. H. LAND 3,462,265

PHOTOGRAPHIC PRODUCTS AND PROCESSES EMPLOYING ALUMINUM IN THE PHOTOSENSITIVE ELEMENT

Filed March 30, 1966

INVENTOR.
Edwin H. Land
BY
Brown and Mikulka
and
Stanley H. Mervis
ATTORNEYS

United States Patent Office 3,462,265

Patented Aug. 19, 1969

3,462,265

PHOTOGRAPHIC PRODUCTS AND PROCESSES EMPLOYING ALUMINUM IN THE PHOTOSENSITIVE ELEMENT

Edwin H. Land, Cambridge, Mass., assignor to Polaroid Corporation, Cambridge, Mass., a corporation of Delaware Filed Mar. 30, 1966, Ser. No. 538,729
Int. Cl. G03c *5/54, 1/06*
U.S. Cl. 96—29 8 Claims

ABSTRACT OF THE DISCLOSURE

The utilization of particulate aluminum in a photosensitive element adapted to be used in a diffusion transfer process in combination with the support for said element is sufficient to provide the requisite opacity to enable processing of said element under ambient light conditions.

Figure 1:
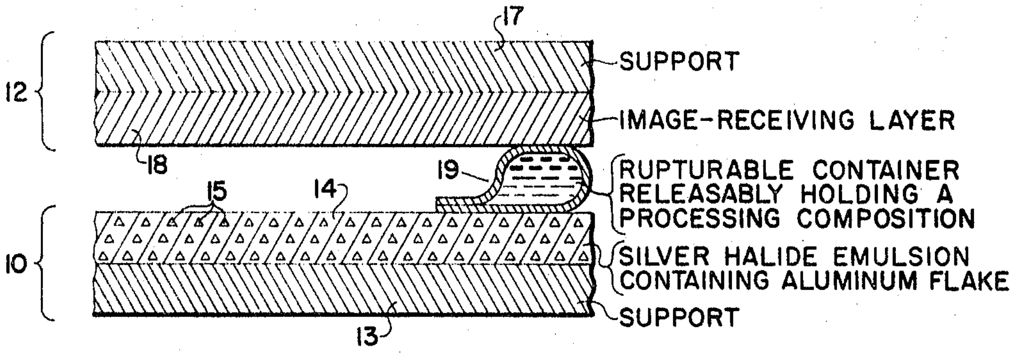

This invention relates to novel photographic products and particularly to photosensitive elements containing an opaque stratum, which elements are particularly useful in diffusion transfer processes and products.

In the well-known diffusion transfer processes, illustrated for example in U.S. Patents Nos. 2,543,181, issued Feb. 27, 1951 and 2,662,822, issued Dec. 15, 1953 both in the name of Edwin H. Land, transfer images are formed by treatment of an exposed photosensitive image-recording sheet material, preferably including as the photosensitive material thereof a silver halide gelatin emulsion, while said sheet is in superposed relationship with a second sheet, said transfer image being formed in an image-receiving stratum carried by said second sheet. Processing is preferably effected by a fluid processing composition distributed in a thin layer between the superposed sheets. Where a silver transfer image is to be formed, the processing fluid provides an aqueous alkaline solution containing a silver halide developing agent, such as hydroquinone, and a silver halide solvent, such as sodium thiosulphate. Exposed silver halide is reduced to silver and an imagewise distribution of a diffusible silver complex is formed as a function of the point-to-point degree of exposure. This imagewise distribution of diffusible silver complex is transferred to the image-receiving layer where it is reduced or precipitated to form the silver transfer print. In most instances, the image-receiving sheet is then separated or stripped from the photosensitive sheet to reveal the transfer image.

The cameras first used for producing photographic prints by the diffusion transfer process were adapted to perform this process entirely within the light tight confines of the camera. In more recently developed cameras adapted to make photographic prints by the diffusion transfer process, the photosensitive material is exposed to actinic radiation in the camera but the processing takes place outside thereof. This is accomplished by making an actinic radiation impervious sandwich of the exposed photosensitive sheet and the image-receiving sheet as said sheets leave the camera, a thin layer of processing composition being distributed therebetween and acting as adherent between said sheets; a film of this type is shown and more fully described, for example, in U.S. Patent No. 3,080,805. The sandwich must be sufficiently impervious to actinic radiation to prevent further photoexposure of the photosensitive layer during the period of processing outside the camera, and this is accomplished by making the backs of the photosensitive sheet and the image-receiving sheet sufficiently opaque so as to prevent actinic radiation from penetrating the sandwich during that period.

In the past, the provision of the requisite opacity for the photosensitive sheet was accomplished by coating the back thereof with an opacifying material, such as carbon black in a suitable binder. Such coatings must be accurately controlled, e.g., as to thickness, since even minor variations may produce light leaks. The cost of film manufacture increases as the number of these coatings necessary to provide reliable opacity increases. In addition, each additional coating increases the likelihood of error and waste.

It has been surprisingly found that finely divided, particulate aluminum, preferably aluminum flake pigment, may be incorporated into the silver halide emulsion in amounts sufficient to obtain the requisite opacity to allow processing to take place outside the camera without interfering with the diffusion transfer process.

The aluminum is intimately admixed with the silver halide and preferably is distributed substantially throughout the thickness of the photosensitive layer. It has also been found that the addition of the particulate aluminum opacifying agent to the silver halide emulsion provides two additional, highly desirable benefits. First, an increase in the film speed may be obtained since the aluminum, especially in flake form, reflects part of the incident light during exposure thereby producing a stronger latent image. Second, the use of the particulate aluminum in the silver halide emulsion appears to prevent, in some manner, the oxidation of certain components of the processing composition used during processing and which composition may be adhered to the photosensitive layer after removal of the transfer image, which oxidation may produce colored oxidation products imparting an undesirable, e.g., brown, stain to the negative image in the photosensitive layer. The resulting unstained negative may be used to produce additional prints by reflection printing, since the aluminum prevents normal printing by transmitted light. The absence of stains makes it possible to obtain better prints than is usually possible when the brown stains are present. In addition, the presence of the aluminum flake appears to reduce or prevent development of residual non-photoexposed silver halide which may become fogged when the photosensitive and image-receiving elements are separated in the light. These additional benefits have not been obtained where aluminum was incorporated in a gelatin sublayer beneath the photosensitive layer. It is within the scope of this invention, however, to employ such a sublayer containing particulate aluminum in combination with a layer of silver halide emulsion containing particulate aluminum in a quantity which may be insufficient by itself to provide the desired opacity; alternatively, a sublayer or back-coat of another opacifying material may be used in combination with a silver halide emulsion containing the particulate aluminum. It will also be appreciated that one may employ such silver halide emulsion layers containing particulate aluminum where opacity per se is not needed and only the anti-oxidant effects are utilized, in which event lesser quantities of aluminum may be employed. In contrast, attempts to provide opacity by adding common opacifying agents, such as carbon black, to the silver halide emulsion, resulted in insufficient opacity or the opacifying agent could not be used in sufficient quantities to provide the necessary opacity without interfering with photoexposure and/or the diffusion transfer process.

Therefore, it is an object of the present invention to provide an opaque photosensitive sheet material particularly adapted for use in diffusion transfer photographic processes which sheet material contains within the photosensitive layer thereof sufficient opacifying material to permit diffusion transfer processing thereof outside of a camera.

It is also an object of the present invention to provide a photosensitive sheet material particularly adapted for use in diffusion transfer photographic processes wherein aluminum provides an opacifying action and/or functions to minimize oxidation of residual processing agents.

Other objects of the invention will in part be obvious and will in part appear hereinafter.

In accordance with the present invention, there is provided a photosensitive sheet material for use in diffusion transfer photographic processes, the silver halide photosensitive emulsion thereof having dispersed therein finely divided, particulate aluminum, which sheet material has sufficient opacity to permit a diffusion transfer process to be performed in the light, said sheet material further having the ability to minimize or prevent oxidation of residual processing reagents. Preferably, the finely divided aluminum is in the form of aluminum flakes.

The present invention accordingly comprises a product possessing the features, properties and the relation of components which are exemplified in the following detailed disclosure and the scope of the invention will be indicated in the appended claims.

Figure 2:
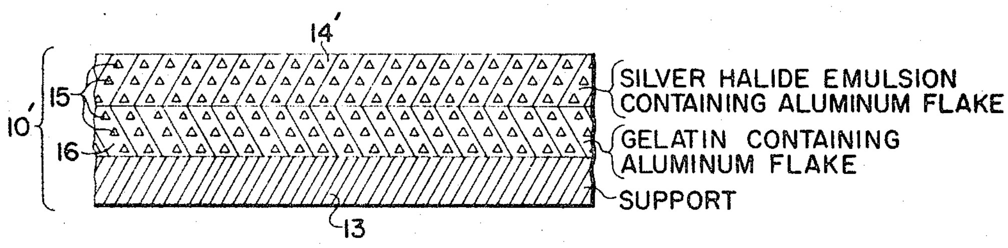

For a fuller understanding of the nature and objects of the present invention, reference should be had to the following detailed description taken in conjunction with the accompanying drawing in which:

FIGURE 1 is a diagrammatic exaggerated cross-sectional view of one embodiment of this invention showing a photosensitive sheet material, produced in accordance with the present invention, associated with an image-receiving element and a rupturable container releasably holding a processing composition adapted to perform a diffusion transfer process; and FIG. 2 is a diagrammatic exaggerated cross-sectional view of another embodiment of a photosensitive sheet material produced in accordance with the present invention.

As shown in FIGURE 1, a photosensitive sheet material 10 comprises a support 13 which is coated with a silver halide gelatin emulsion layer 14 containing particulate aluminum in the form of aluminum flake pigment, diagrammatically represented as triangles denoted by numeral 15. An image-receiving element 12 comprising a support 17 carrying an image-receptive layer 18 is shown so positioned with respect to said photosensitive sheet 10 that a processing composition, releasably held in a rupturable container 19, may be spread between said sheets.

Prior to exposure of the photosensitive sheet 10 to actinic radiation, the sheets 10 and 12 may be positioned in a camera in known manner so that the silver halide emulsion layer 14 may be exposed to actinic radiation. Following exposure, the two sheets are brought together and passed through two suitably separated pressure applying members, e.g., steel rollers, to rupture the container 19 and cause the processing composition contained therein to be spread between the photosensitive sheet 10 and the image-receiving sheet 12. The construction of such rupturable containers is well known and need not be set forth here.

The processing composition is effective to provide an alkaline solution containing the reagents necessary to perform the particular process, said reagents being initially contained in the processing composition or dissolved therein from the photosensitive and/or image-receiving sheets. The processing composition preferably contains a thickening agent to increase the viscosity of the composition to control spreading. The thickening agent is preferably a film-forming material which is stable and soluble in aqueous alkaline solutions. Polymeric materials such as sodium carboxymethyl cellulose, hydroxyethyl cellulose, and the sodium salts of poly-methacrylic acid and polyacrylic acid may be mentioned as illustrative. Preferably, the thickening agent is used in sufficient quantities to impart to the processing composition a viscosity in excess of 1000 centipoises at a temperature of approximately 24° C. The best results are obtained when the viscosities are in the range of 1000 to 200,000 centipoises at 24° C.

The particulate aluminum used in accordance with the present invention is preferably in the form of metallic flakes, though other forms of finely divided aluminum, such as powder, may also be used. These flakes are commercially available and may be of any size useful for pigmentation. The aluminum flake may be of the leafing or non-leafing variety, the leafing type being preferred. The flake is preferably added in the form of dry, pure metal flake, though pigment pastes in which the flake is dispersed in a suitable carrier may also be used. Commercially available dry aluminum flake pigments may be illustrated by Reynolds Pigment No. 408 and Reynolds Pigment No. 422, obtainable from the Reynolds Metals Co., Richmond, Va.

The amount of particulate aluminum to be utilized is primarily determined by the degree of opacity desired to be obtained. High-speed photographic film is more sensitive to actinic radiation and therefore requires a greater degree of opacity than low-speed film if processed outside a camera. The amounts of particulate aluminum used in accordance with the invention will therefore vary accordingly. Quantities of particulate aluminum in excess of that necessary to provide the requisite opacity should be avoided as uneconomical; substantial excesses may have an adverse effect on the rate at which the diffusion transfer process is accomplished. It has been found that adequate opacity for a 3000 exposure index film having a processing period of about 10 to 60 seconds is obtained if the aluminum is present in a quantity, together with any opacity provided by the support (e.g., baryta paper), to provide a transmission density of at least 4.0; somewhat lower transmission densities are adequate for lower exposure index film, while somewhat higher transmission densities may be necessary if the processing period is much longer than 30 seconds.

With regard to the anti-oxidant effect, quantities of particulate aluminum necessary to prevent the oxidation of residual processing reagents, e.g., silver halide developing agents, are, preferably, in a weight ratio of particulate aluminum to silver halide in the same layer of 1 to 1. However, and as will appear more fully hereinafter, this ratio may be slightly reduced if there is an alkali pervious aluminum containing sublayer beneath the aluminum containing silver halide emulsion layer, since the particulate aluminum in the sublayer will add to the anti-oxidant effect of the aluminum in the emulsion layer. It is preferred to maintain the anti-oxidant required ratio of particulate aluminum to silver halide in the emulsion layer without relying on the aluminum in the sublayer.

The support for the photosensitive sheet may be formed of either transparent or opaque material as desired. Baryta paper, for instance, has some opacity and is an effective support material. When using a support which has some opacity, the amount of aluminum used in the silver halide emulsion may be reduced accordingly over that amount necessary when the support is transparent, while still providing the requisite opacity to allow for development of the film unit outside the camera. Other materials which may be used as supports for either sheet include conventional support materials, such as other papers, cellulose acetate, etc. Where processing is to be effected in the light, the support for the image-receiving layer is rendered opaque by the addition thereto of suitable opacifying agents or by an opacifying layer.

The image-receiving element 12 may comprise a single layer of any suitable image-receptive material, or it may comprise a suitable base or support material carrying thereon a coating or layer of the image-receptive material. The image-receptive material may also contain various photographic agents and reagents such as, for example, one of the vigorous silver precipitating environments described in U.S. Patent Nos. 2,698,237 and 2,698,245.

Any silver halide emulsion may be used in the present invention, and the binder may be gelatin or any other suitable binder, and may be of high or low photographic speed. A low-speed emulsion may be characterized as one having an ASA speed rating of 200 and an ASA exposure index in daylight of 50. A high-speed emulsion may be considered to be one which would have an ASA exposure index in daylight of between 2000 and 3000 when used in a silver transfer process.

In FIGURE 1 there is shown an image-recording material in which the aluminum is contained within the silver halide gelatin emulsion. This form is preferred for low-speed photographic film, e.g., those utilizing a low-speed photographic emulsion, since sufficient quantities of aluminum can be used to provide the requisite opacity without affecting the diffusion transfer process. For high-speed photographic film it is desirable to utilize the double layer negative as shown in FIG. 2 in which the aluminum is contained in two layers. In either embodiment, positioning the aluminum within the silver halide emulsion is effective against lateral as well as transverse light transmission.

Referring to FIG. 2, there is shown a photosensitive element 10′ comprising a support 13 which is coated with a sublayer 16 comprising an alkali permeable material containing aluminum flake pigment which sublayer is overcoated with an aluminum flake pigment containing silver halide gelatin emulsion layer 14′. The permeable material for the sublayer 16 may be of the same material as the carrier or binder for the silver halide grains in the emulsion layer, such as gelatin, or it may be of a different material which is pervious to aqueous alkaline solution, such as polyvinyl alcohol. The main requirement as to the quantities of aluminum in the respective layers is that the combined amounts contained in both layers be sufficient to provide the desired opacity and that there be a sufficient quantity in the silver halide emulsion layer to provide, alone or in combination with the aluminum in the sublayer, the desired anti-oxidant effect. Preferably, the quantity of aluminum within the silver halide emulsion layer is itself sufficient to provide the desired anti-oxidant effect.

The foregoing discussion has been primarily directed to those types of film which are adapted to be processed outside a camera. However, the principles expressed equally apply to film adapted to be processed within a camera, in which event the quantity of aluminum used may be reduced to that level necessary to provide only the anti-oxidant effect.

The following examples are given to illustrate the present invention and are not intended to be limiting. In each of these examples, the aluminum containing layers were applied at a coating speed of 10 feet/minute using a dip coater. In each example, the photosensitive elements exhibited a transmission density of approximately 4.0 or more.

EXAMPLE 1

3 g. of gelatin were swelled in 40 cc. of cold water for one hour. 0.25 cc. of 25% solution of a wetting agent (Triton X–100 sold by Rohm & Haas, Washington Square, Philadelphia, Pa.) was added to the gelatin and the gelatin was melted. 3 g. of aluminum flake (Reynolds Pigment Powder 408, Reynolds Metals Co., Richmond, Va.) was then stirred (by a magnetic stirrer) into the melted gelatin. 12 g. of a low-speed, uniform grain size silver halide gelatin emulsion in melted form was added to the mixture. The final mixture was coated on a cellulose acetate film base having an antihalation layer imparting a blue tint to the support, to provide a layer containing, per square foot, approximately 830 mg. of aluminum, 270 mg. of silver and 1030 mg. of gelatin. The resulting photosensitive sheet was exposed to a step wedge and the exposed photosensitive sheet was processed with an image-receiving sheet and a layer of processing composition 0.0022″ thick of the type employed in Type 107 Polaroid Land film. A good silver transfer positive was obtained after 10 seconds imbibition, and the negative image was free of developer stain over a 10-month period. In contrast, the negative image obtained by repeating this experiment without the aluminum flake pigment and using a conventional opacifying layer, did exhibit brown stains.

EXAMPLE 2

The procedure described in Example 1 was repeated using 2 g. of aluminum flake pigment (Reynolds Pigment Powder 408), and coating the pigmented emulsion on plain baryta paper to provide a layer containing, per square foot, approximately 460 mg. of aluminum, 220 mg. of silver and 850 mg. of gelatin. The photosensitive material was exposed in a Model 100 Polaroid Land camera at an exposure index of 150 and processed as in Example 1. A good diffusion transfer positive silver print was obtained and the negative in the photosensitive sheet exhibited no brown stains over a period of 10 months. During processing, a 500-watt photoflood lamp was held 12″ from the back surface of the photosensitive sheet and no light spotting appeared on the negative or positive.

EXAMPLE 3

A photosensitive element was prepared as in Example 1 using 2 g. of aluminum flake (Reynolds Pigment Powder 408) and 12 g. of a high-speed silver halide emulsion. The photosensitive element contained approximately 490 mg. of aluminum per square foot and exhibited good light opacity. A good diffusion transfer print was obtained at an exposure index of 3000 using an image-receiving sheet and processing composition of the type used in Type 47 Polaroid Land film, and the negative did not oxidize over a 10-month period.

EXAMPLE 4

A photosensitive material having aluminum in both the subcoat and the silver halide gelatin emulsion was prepared as follows: A coating mixture of 3 g. gelatin, 40 cc. water, 0.5 cc. of a 25% solution of Triton X–100 wetting agent, and 5 g. Reynolds Pigment Powder 408 aluminum flake was coated on baryta paper to provide a layer containing approximately 1400 mg. aluminum and 840 mg. gelatin per square foot. This layer then was overcoated with a high-speed gelatin emulsion having the same composition as that in Example 3 except that only 1 g. of aluminum flake (Reynolds Pigment Powder 408) was present; the resulting silver halide emulsion contained approximately 210 mg. aluminum per square foot. The photosensitive sheet so produced was exposed at an exposure index of 3000 in a Model 100 Polaroid Land camera and processed outside the camera using an image-receiving sheet and a processing composition (0.0022″ thick) of the type employed in Type 107 Polaroid Land film. After an imbibition period of 15 seconds, a good diffusion transfer silver print was obtained. The negative did not oxidize or turn brown after ten months. The opacity of the photosensitive material was examined during processing by positioning a 60-watt lamp 6 inches from the back of the photosensitive sheet; no light leakage was observed and there was no loss of transfer density. This test was repeated placing a 500-watt photoflood lamp 12 inches from the back of the photosensitive sheet; only very small loss of transfer image density was observed. This test more than exceeds the practical requirements for opacity.

Examination of photomicrographs of photosensitive elements prepared in the above examples showed that the aluminum was well distributed throughout the silver halide emulsion layer and had not significantly settled within that layer. A very thin, clear layer of gelatin having a thickness on the order of an anti-abrasion layer was observed in some instances.

As evidenced by the above examples, this invention provides a fast, simple, inexpensive and highly effective method of providing opaque layers in photosensitive element. It is particularly significant that the desired opacity may be obtained by the single step of coating the silver halide emulsion layer.

The double layer negative structures of Examples 3 and 4 may also be effectively employed using low-speed photosensitive emulsions. Although this invention has been illustrated in connection with a silver diffusion transfer process, these novel photosensitive elements may be employed in color transfer processes, stratum transfer processes, and in non-transfer processes, particularly those processes involving rapid access processing where the imparted opacity may permit more flexibility in designing or using the rapid access processor. In addition to a preformed image-receiving layer as used in the above examples, one may also form a tranfer image in a solidified layer of the processing composition, as described in the aforementioned U.S. Patent No. 2,662,822.

Since certain changes may be made in the above process without departing from the scope of the invention herein involved, it is intended that all matter contained in the above description (or shown in the accompanying drawing) shall be interpreted as illustrative and not in a limiting sense.

What is claimed is:

1. A photosensitive element comprising a support and a layer of photosensitive silver halide, said layer having finely divided, particulate aluminum distributed substantially therethrough.

2. A photosensitive element as defined in claim 1 wherein a layer of an alkali permeable material and containing finely divided, particulate aluminum is positioned between said support and said silver halide emulsion layer.

3. A photosensitive element as defined in claim 1 in which said particulate aluminum is aluminum flake pigment.

4. A photosensitive element as defined in claim 2 in which the binder in each of said emulsion layer and said other layer comprises gelatin.

5. A photosensitive element as defined in claim 1 wherein said support and said aluminum containing layer have a combined transmission density of at least 4.0.

6. In a photographic process wherein an element containing a support and an exposed photosensitive silver halide stratum is processed to provide an imagewise distribution of transferable image-forming components and at least a portion of said imagewise distribution is transferred by diffusion to a superposed image-receiving stratum, the improvement wherein said silver halide stratum contains a quantity of finely divided particulate aluminum which, in combination with said support, is sufficient to render said silver halide opaque to radiation actinic thereto for at least the period of said processing.

7. A process as defined in claim 6, wherein said processing period is about 10 to 60 seconds.

8. A process as defined in claim 7 wherein said processing is effected in ambient light and said particulate aluminum is sufficient to provide a transmission density of at least 4.0.

References Cited

UNITED STATES PATENTS

| | | | |
|---|---|---|---|
| 2,839,378 | 6/1958 | McAdow | 75—5 |

FOREIGN PATENTS

| | | |
|---|---|---|
| 221,159 | 5/1955 | Australia. |
| 504,283 | 4/1939 | Great Britain. |

NORMAN G. TORCHIN, Primary Examiner

J. P. BRAMMER, Assistant Examiner

U.S. Cl. X.R.

96—94